United States Patent
Kawai

(10) Patent No.: US 8,102,572 B2
(45) Date of Patent: Jan. 24, 2012

(54) IMAGE PROCESSING APPARATUS AND ASSOCIATED METHOD AND COMPUTER READABLE STORAGE MEDIUM FOR EXTRACTING AN EMBEDDED MARKING IMAGE

(75) Inventor: Yoshifumi Kawai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 686 days.

(21) Appl. No.: 12/174,772

(22) Filed: Jul. 17, 2008

(65) Prior Publication Data
US 2009/0033971 A1    Feb. 5, 2009

(30) Foreign Application Priority Data
Jul. 30, 2007    (JP) .................. 2007-196994

(51) Int. Cl.
*H04N 1/40*    (2006.01)
(52) U.S. Cl. ........ 358/3.28; 358/1.9; 358/540; 358/539; 382/167; 382/100
(58) Field of Classification Search .................. 358/3.28, 358/1.9, 540, 539; 382/167, 100
See application file for complete search history.

(56) References Cited

U.S. PATENT DOCUMENTS

2003/0147549 A1*  8/2003  Choi et al. .................. 382/100
2007/0019260 A1*  1/2007  Tokie ........................... 358/540

FOREIGN PATENT DOCUMENTS

| JP | 2006-005584 | 1/2006 |
| JP | 2006-027145 | 2/2006 |
| JP | 2006-258898 | 9/2006 |

* cited by examiner

*Primary Examiner* — Twyler Haskins
*Assistant Examiner* — Michael Burleson
(74) *Attorney, Agent, or Firm* — Oblon, Spivak, McClelland, Maier & Neustadt, L.L.P.

(57) ABSTRACT

An image processing apparatus and an associated an image processing method and computer readable storage medium are provided. The image processing apparatus includes an image reading module, an image data storage module, a registration module, an analyzing module, and an image processing module. The image reading module can read a document image. The image data storage module can store the document image. The registration module can register marking images by respectively encoding marking information into the marking images. The analyzing module can extract an embedded image from the document image and to perform an analysis of the embedded image that includes comparing the embedded image to the marking images registered in the registration module. The image processing module can compose an output image based on the document image stored in the storage module and a result of the analysis of the embedded image performed by the analyzing module.

10 Claims, 13 Drawing Sheets

FIG. 9

| MARKING IMAGE | DOCUMENT ID | USER ID | PAPER SIZE | PRINT SIDE | ... |
|---|---|---|---|---|---|
| [QR] | DOC001 | User1 | A4 PORTRAIT | 1SIDE→1SIDE | ⋮ |
| [QR] | DOC002 | User2 | A3 LANDSCAPE | 1SIDE→2SIDE | ⋮ |
| ⋮ | ⋮ | ⋮ | ⋮ | ⋮ | ⋮ |
| 200a | 200b | 200c | 200d | 200e | |

IMAGE PROCESSING APPARATUS AND ASSOCIATED METHOD AND COMPUTER READABLE STORAGE MEDIUM FOR EXTRACTING AN EMBEDDED MARKING IMAGE

CROSS REFERENCE TO RELATED APPLICATIONS

This application is based upon and claims priority under 35 U.S.C. §119 from Japanese Patent Application No. 2007-196994, filed Jul. 30, 2007, the entire contents of which are hereby incorporated by reference.

BACKGROUND OF THE INVENTION

1. Field of the Invention

The present invention generally relates to an image processing apparatus, an image processing method, and a computer readable storage medium. More particularly, an image processing apparatus and an associated an image processing method and a computer readable storage medium that extract an embedded marking image from a document are provided in which the marking image expresses predetermined information that can control the image processing apparatus.

2. Description of the Related Art

In the related art, an MFP (Multi Function Peripheral) includes a function of extracting an embedded marking image (for example, a bar code or particular image) from a document. The marking image can represent, for example, a document identification that identifies the document, or a print condition that includes finishing conditions related to the document.

For example, an image processing apparatus is known which detects a marking on a scanned document, and can then restrict printing based on the detection of the marking. (See, for example, Japanese Laid-Open Patent Application No. 2006-258898, published on Sep. 28, 2006.)

On the other hand, a printer is known that adds a bar code to a print image. (See, for example, Japanese Laid-Open Patent Application No. 2006-027145, published on Feb. 2, 2006, and Japanese Laid-Open Patent Application No. 2006-005584, published on Jan. 5, 2006.)

In the related art, when a marking has damage (for example, image graze, or a part of the image is missing), it becomes difficult to extract the marking.

SUMMARY OF THE INVENTION

In one exemplary aspect, an image processing apparatus is provided. The image processing apparatus includes an image reading module, an image data storage module, a registration module, an analyzing module, and an image processing module. The image reading module is configured to read a document image. The image data storage module is configured to store the document image. The registration module configured to register marking images by respectively encoding marking information into the marking images. The analyzing module is configured to extract an embedded image from the document image and to perform an analysis of the embedded image that includes comparing the embedded image to the marking images registered in the registration module. The image processing module is configured to compose an output image based on the document image stored in the storage module and a result of the analysis of the embedded image performed by the analyzing module.

In another exemplary aspect, an image processing method is provided. The image processing method includes reading a document image, storing the document image in a storage module, and registering a marking image in a registration module by encoding a first marking information into the marking image. The method further includes analyzing an embedded image in the document image by extracting a second marking information from the embedded image and comparing the embedded image to the marking image in the registration module. An output image based on the document image stored in the storage module and a result of the analyzing the embedded image is then composed, and the output image is output.

In another exemplary aspect, a computer readable storage medium is provided. The computer readable storage medium includes computer executable instructions, such that the instructions, when executed by a processor, cause the processor to perform a method that includes reading a document image, storing the document image in a storage module, and registering a marking image in a registration module by encoding a first marking information into the marking image. The method further includes analyzing an embedded image in the document image by extracting a second marking information from the embedded image and comparing the embedded image to the marking image in the registration module. An output image based on the document image stored in the storage module and a result of the analyzing the embedded image is then composed, and the output image is output.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a diagram that illustrates an exemplary data structure that relates to marking registration information in an image processing apparatus according to an exemplary aspect of the present invention;

DESCRIPTION OF THE PREFERRED EMBODIMENTS

Preferred embodiments of the present invention are described below with reference to the accompanying drawings, but the present invention isn't limited to these exemplary embodiments.

In the following description, the image processing device is an MFP (Multi Function Peripheral), which can execute image processing functions such as copying, faxing, scanning, or printing. However, the present invention is not limited in implementation to MFP's.

Figure 1:
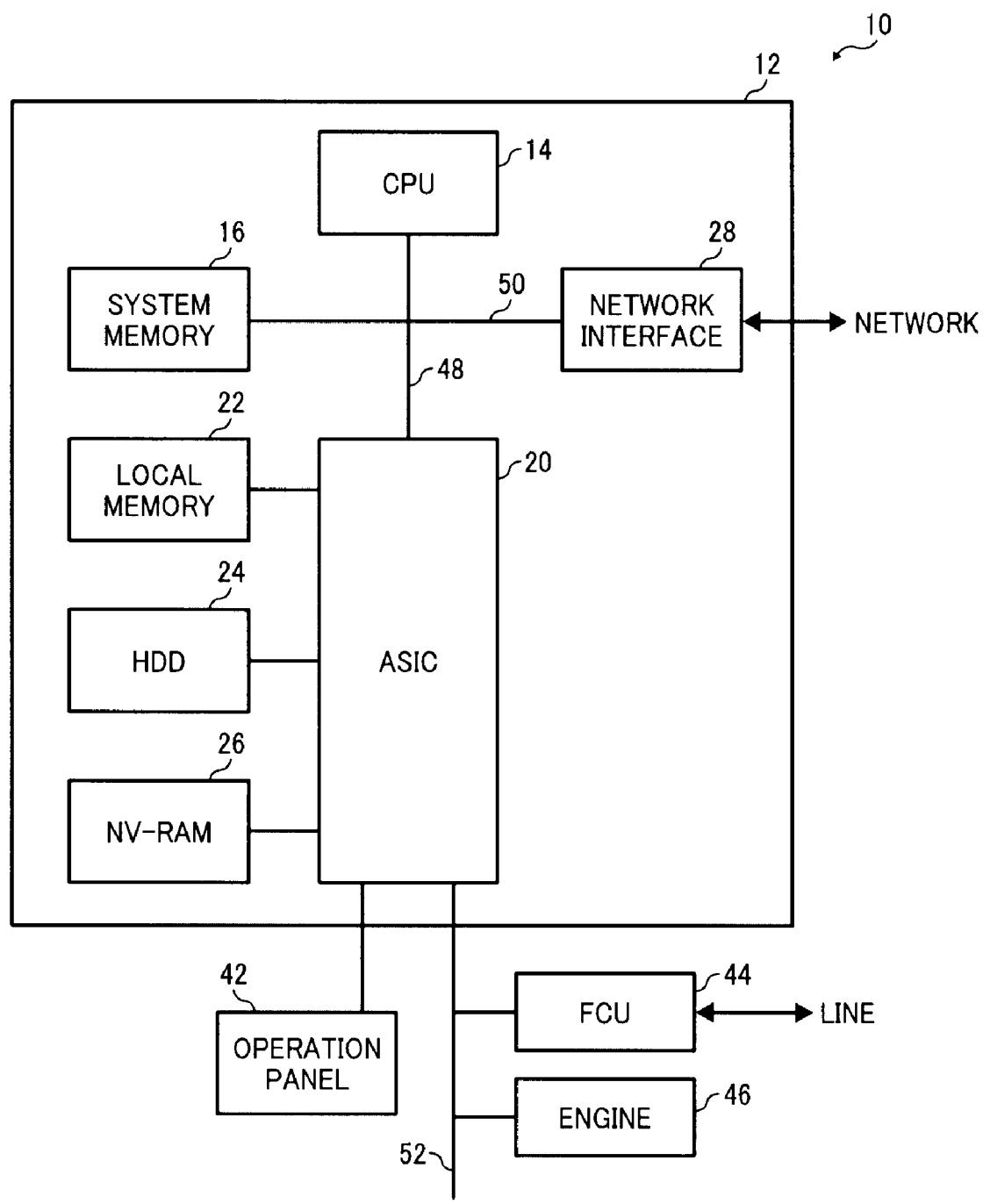
FIG. 1 is a diagram that illustrates a hardware configuration of an exemplary image processing apparatus according to an exemplary aspect of the present invention.

Referring now to the drawings, wherein like reference numerals designate identical or corresponding parts throughout the several views, and more particularly to FIG. 1 thereof, FIG. 1 is a diagram that illustrates a hardware configuration of an exemplary image processing apparatus according to an exemplary aspect of the present invention. An MFP 10 includes a controller 12, an operation panel 42, an FCU (facsimile control unit) 44, and an engine module 46. The controller 12 includes a CPU (central processing unit) 14, a system memory 16, an ASIC (application-specific integrated circuit) 20, a local memory 22, an HDD (Hard Disk Drive) 24, an NV-RAM 26, a Network interface 28, and a system bus 48, 50.

Figure 2:
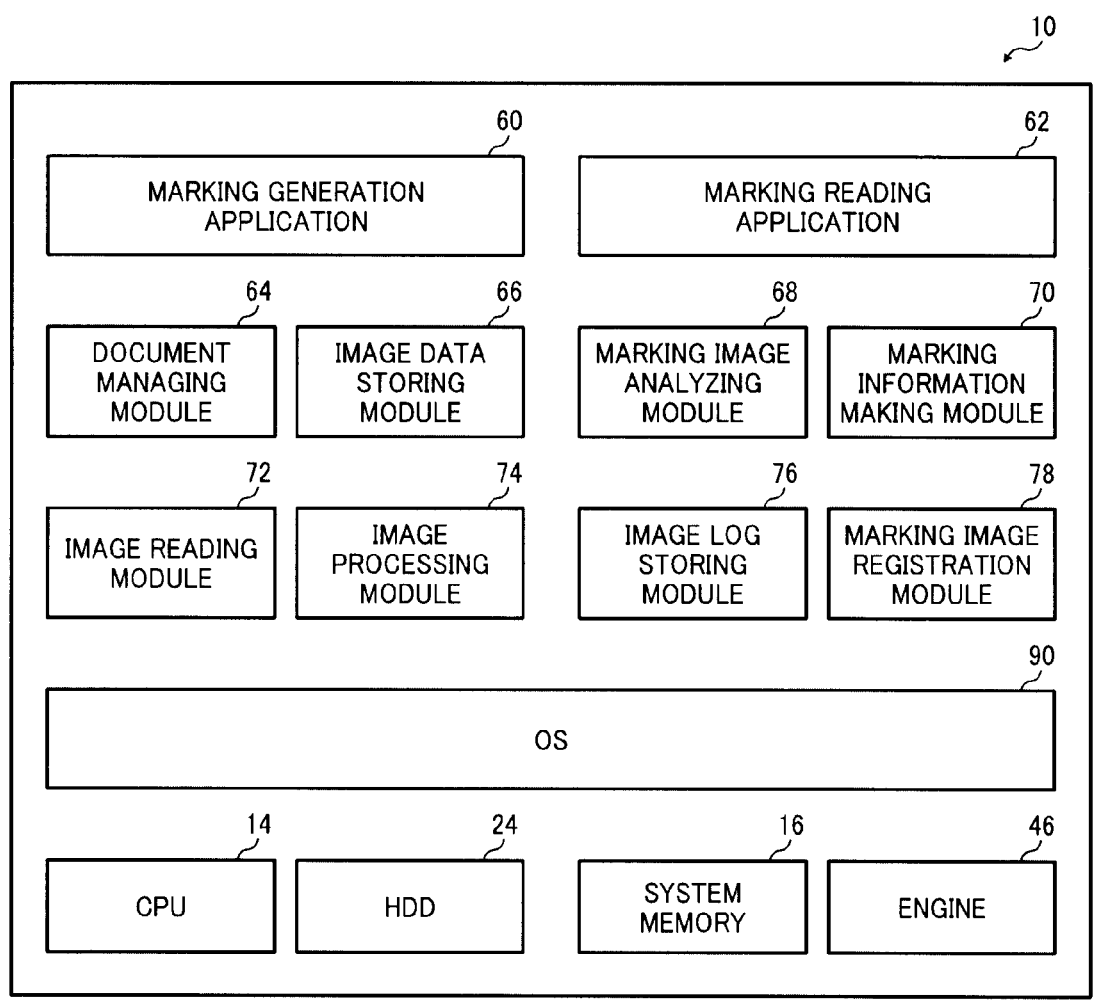
FIG. 2 is a diagram that illustrates a software configuration of an exemplary image processing apparatus according to an exemplary aspect of the present invention.

FIG. 2 is a diagram that illustrates a software configuration of an exemplary image processing apparatus according to an exemplary aspect of the present invention. Referring to FIG. 2, the MFP 10 includes two applications (60,62) that provide a plurality of functions for a user, a plurality of control modules (64,66,68,70,72,74,76,78) that provide common services to the applications, an OS (Operating System) 90, and several hardware resources (14,24,16,48).

The applications include a marking generation application 60 that is configured to print a marking image, and a marking reading application 62 that is configured to read markings and print according to marking information. As for the control modules, the MFP includes a document managing module 64, an image data storing module 66, a marking image analyzing module 68, a marking information making module 70, an image reading module 72, an image processing module 74, an image log storing module 76, and a marking image registration module 78.

The image data storing module 66 stores an image data scanned by the MFP. The image log storing module 76 stores an image processing log data of the MFP. The log data may include, for example, image data, image ID, processing date, processing user, and/or OCR (optical character recognition) data of the document image data. The image reading module 72 controls a scanner of the MFP in order to read document image data. The image processing module 74 controls a plotter engine in order to print. The marking image analyzing module 68 is used by the marking reading application 62, and analyzes the read document image data, extracts an embedded marking image from the document image data, gets marking information from the extracted marking image, and controls print processing according to the marking information. The marking information making module 70 and the marking image registration module 78 are used by the marking generation application 60 to generate a marking image.

Figure 3:
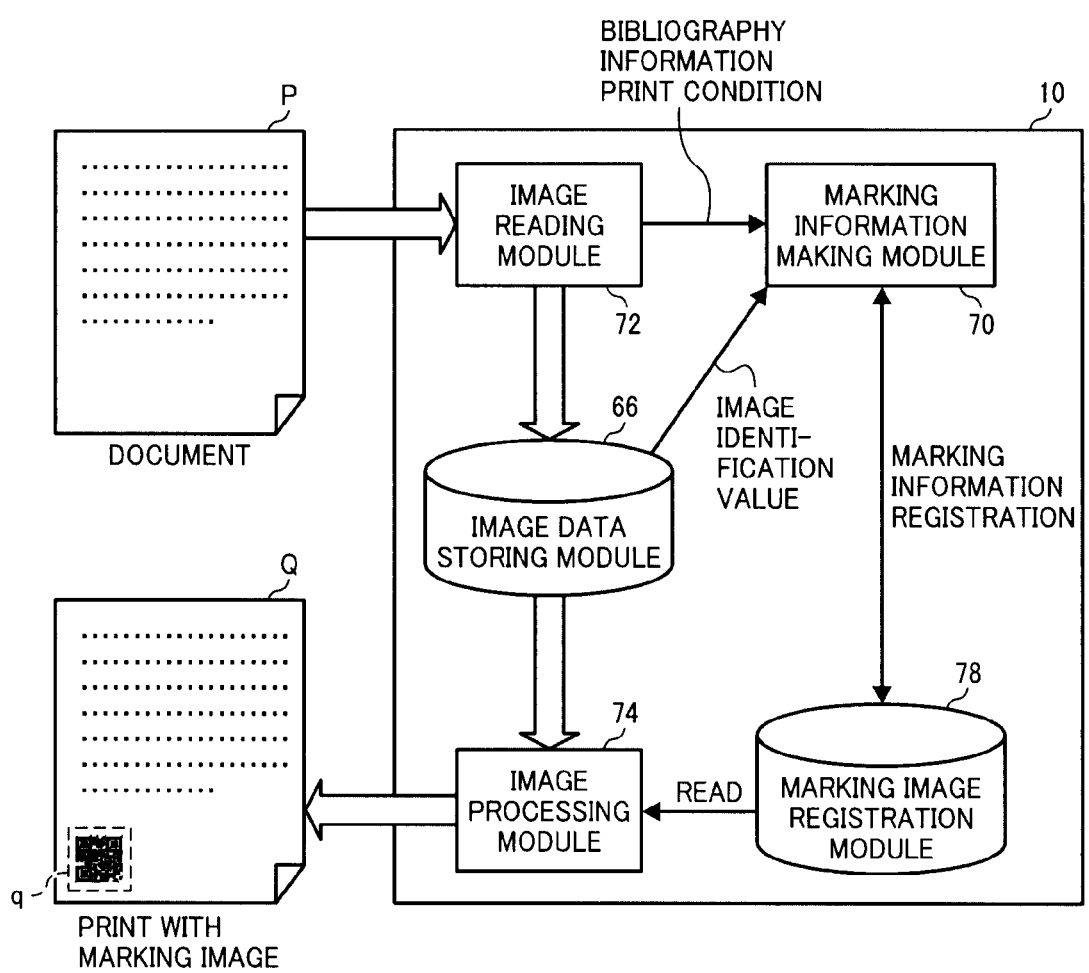
FIG. 3 is a diagram that illustrates a data flow of an exemplary printing process that includes a marking image of an image processing apparatus according to an exemplary aspect of the present invention.

FIG. 3 is a diagram that illustrates a data flow of an exemplary printing process that includes a marking image of an image processing apparatus according to an exemplary aspect of the present invention. Referring to FIG. 3, the image reading module 72 scans a document P and reads a document image data. The image data storing module 66 stores the document image data to the HDD 24 (such as that depicted in FIG. 1) or to other storages, which may include a storage connected through a network. The marking information making module 70 receives document image data information, for example, print condition and bibliography information, from the image reading module 72, and an image identification value from the image data storing module 66. The marking information making module 70 makes marking information from the document image data information. The marking image registration module 78 encodes the marking information to a marking image (for example, bar cord or two-dimensional cord), and registers the marking image as a marking registration information to the NV-RAM 26 (depicted in FIG. 1).

FIG. 9 is a diagram that illustrates an exemplary data structure of the marking registration information of an image processing apparatus according to an exemplary aspect of the present invention. Referring to FIG. 9, the marking registration information 200 includes a marking image field 200a, and other related data fields corresponding to the marking image field 200a. For example, the marking registration information 200 depicted in FIG. 9 includes a document ID field 200b that specifies the document image data which may includes a plurality of pages, a user ID field 200c that specifies a bibliography information, a paper size field 200d and a print side field 200e that each specifying a print condition. In addition, the marking registration information 200 may includes a processing date, and other print conditions (for example, staple finishing, punch finishing, and two-in-one printing).

Returning to FIG. 3, the image processing module 74 composes document image data stored in the image data storing module 66 and the marking image registered in the marking image registration module 78, and prints the PRINT Q with the marking image q. The image processing module 74 may compose the marking image q to a predetermined position on the document. It improves efficiency to analyze embedded (composed) marking image from the predetermined position afterwards.

Figure 4:
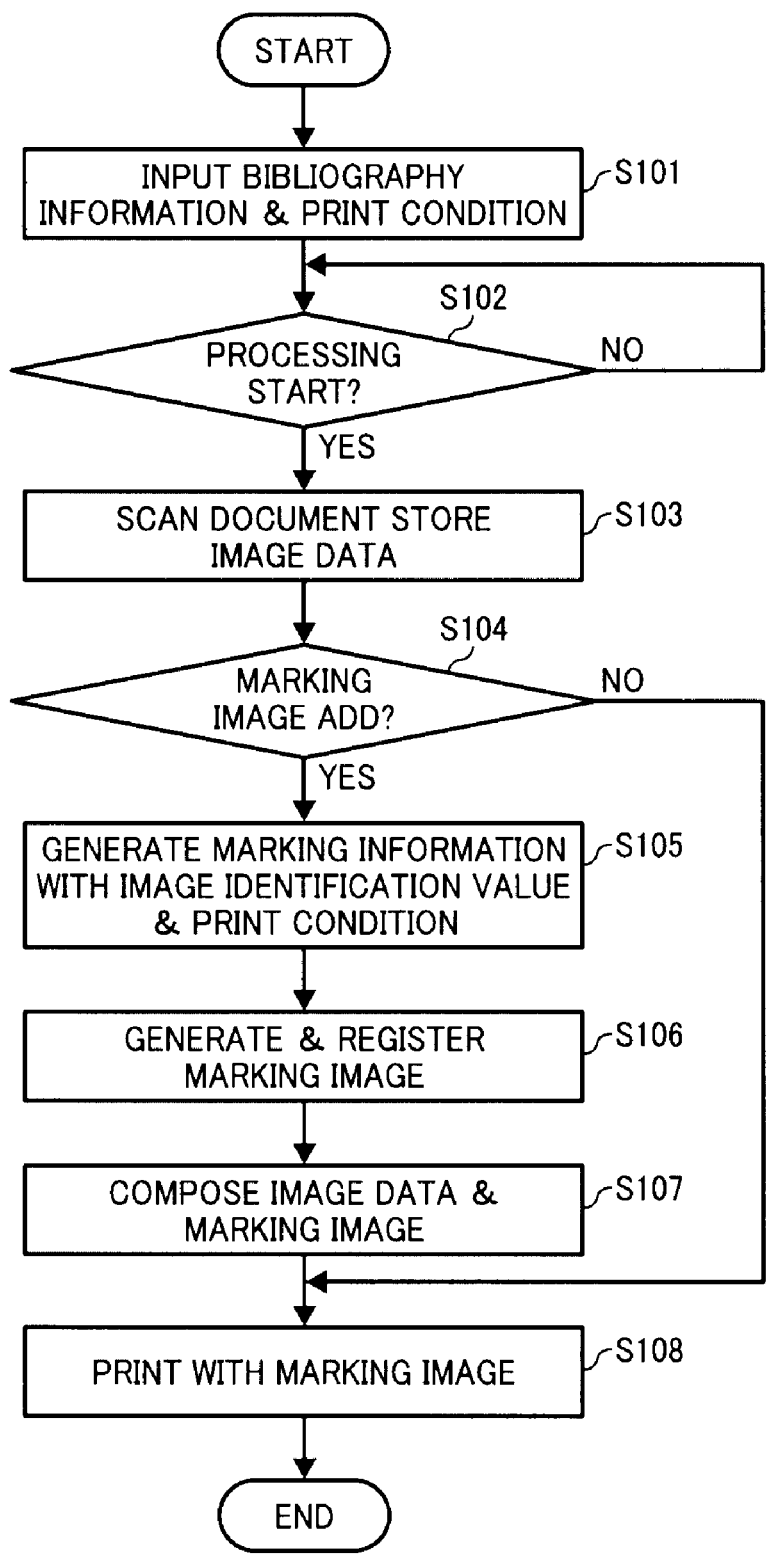
FIG. 4 is a flow chart that illustrates an exemplary image processing apparatus according to an exemplary aspect of the present invention.

FIG. 4 is a flow chart that illustrates an exemplary print process of an image processing apparatus according to an exemplary aspect of the present invention. Referring now to the steps in FIG. 4, the hardware configuration depicted in FIG. 1, and the data flow in FIG. 3, the user begins by inputting instructions for composing a marking image that includes bibliography information and print conditions from the operation panel 42 (S101). When the user pushes a start button to start processing (S102), the image reading module 72 scans the document P, stores the document image data to the image data storing module 66, and assigns a document ID (S103). If the user inputs an instruction to compose a marking image (S104), marking information making module 70 generates the marking information with the predetermined format from the document ID, the print condition, and the bibliography information, for example (S105). The marking image registration module 78 then encodes the marking information, generates the marking image, and registers the marking information and the marking image (S106). The image processing module 74 composes the image data and the marking image (S107). Finally, the PRINT Q is printed with the marking image q (S108).

Figure 5:
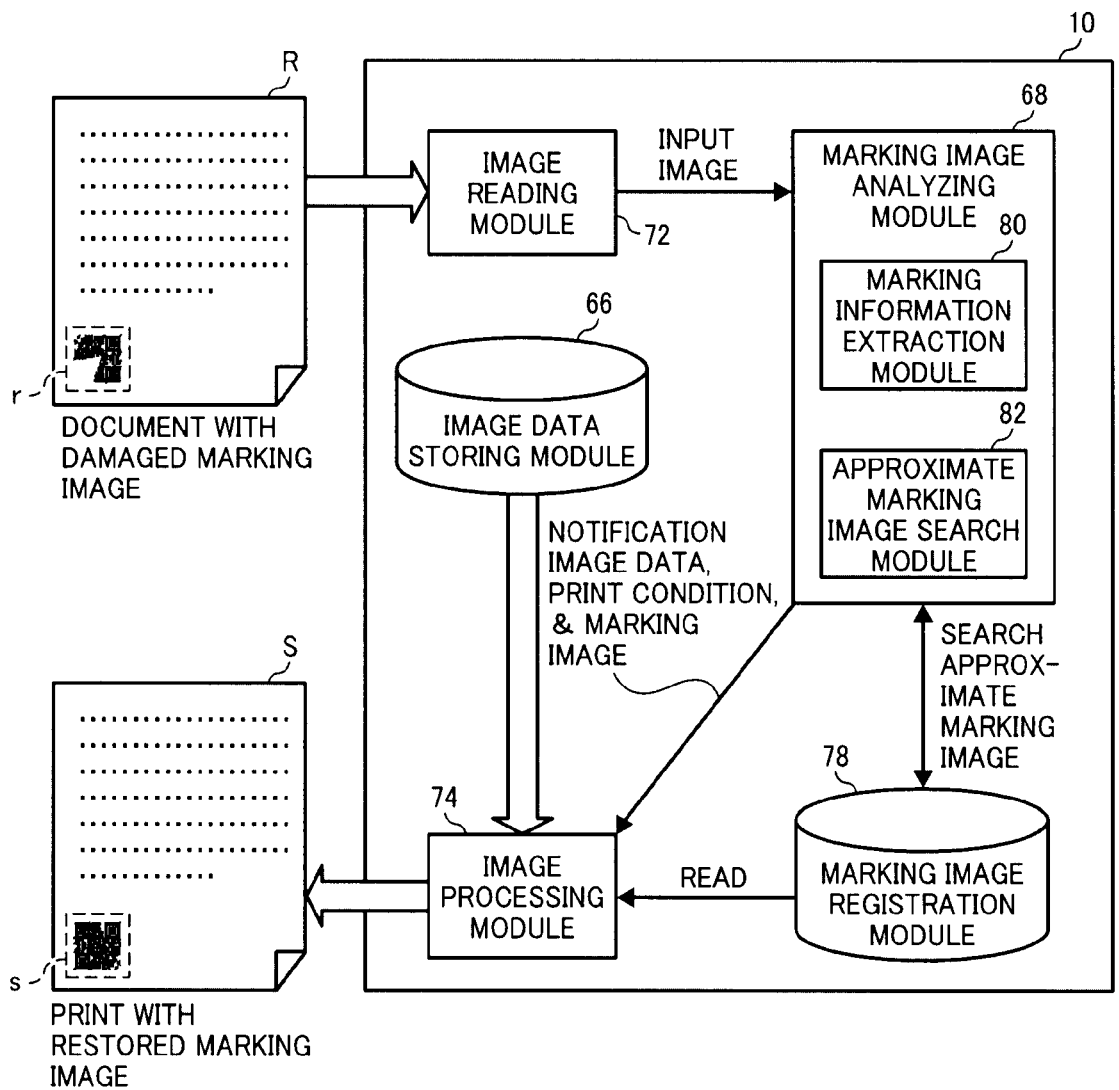
FIG. 5 is a diagram that illustrates a data flow of an exemplary image processing apparatus according to an exemplary aspect of the present invention.
Figure 6:
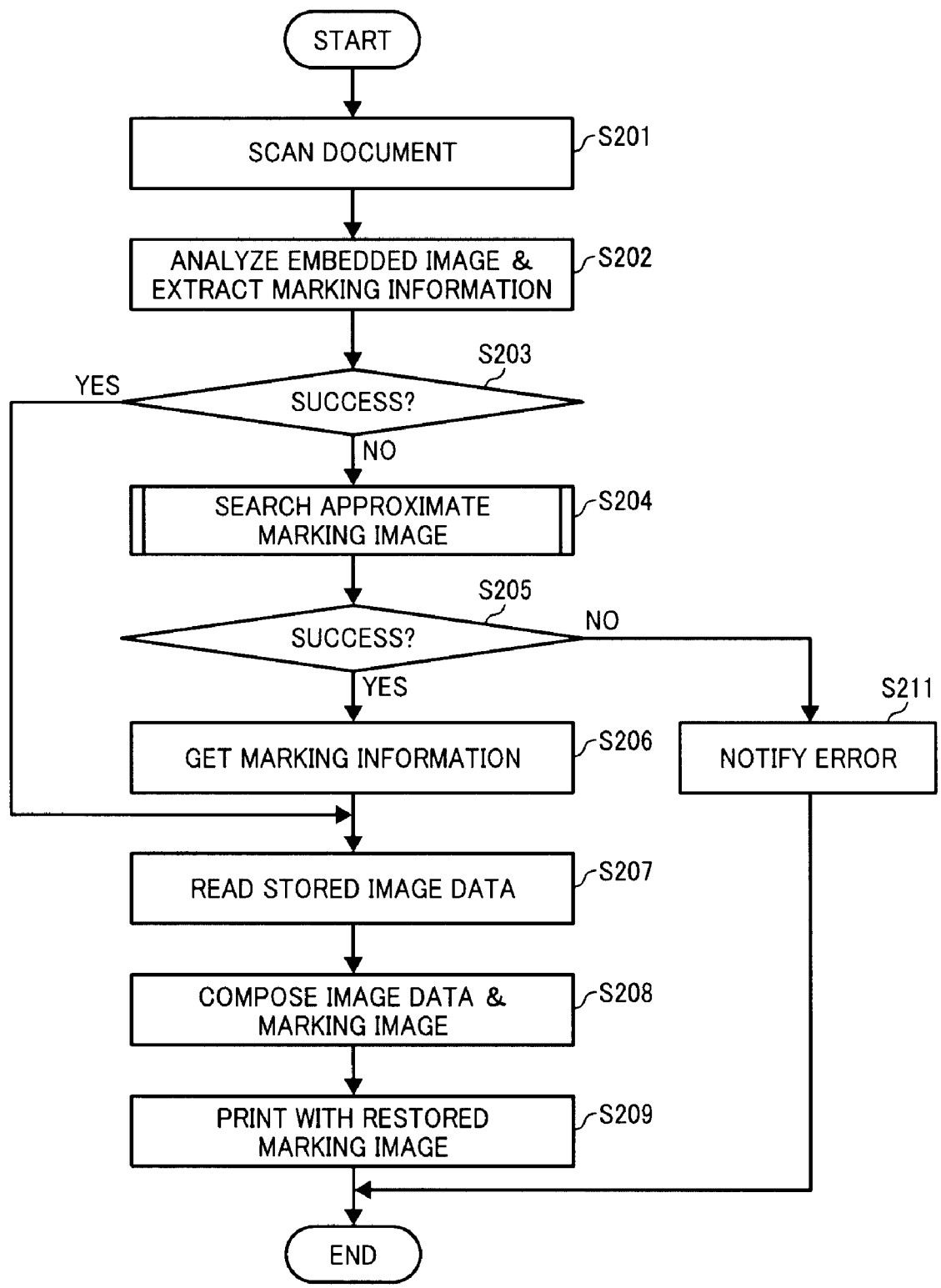
FIG. 6 is a flow chart that illustrates an exemplary image processing apparatus according to an exemplary aspect of the present invention.

Should MFP 10 fail to decode the marking image of the document due to damage to the marking image, the MFP 10 can search for an approximate marking image from among several stored marking images. FIG. 5 is a diagram that illustrates a data flow of an exemplary image processing apparatus that searches for an approximate marking image according to an exemplary aspect of the present invention, and FIG. 6 is a flow chart that illustrates an exemplary print process that includes a search for an approximate marking image in an image processing apparatus according to an exemplary aspect of the present invention.

A search for an approximate marking image will now be described with reference to FIG. 5 and FIG. 6, as well as FIGS. 3 and 4. In FIG. 5, an MFP 10 includes a marking image analyzing module 68 that includes a marking information extraction module 80, and an approximate marking image search module 82. As can be see in FIG. 6, a document image data is scanned (S201). The marking information extraction module 80 then decodes an embedded image that has a predetermined position on the scanned document image data, and then extracts marking information (S202). Should the marking information extraction module 80 fail to decode a marking image of the document due to damage to the marking image (S203), the approximate marking image search module 82 searches for an approximate marking image from the marking image registration module 78 (S204). If the approximate marking image search module 82 determines that a search has been successful (S205), it selects the marking image corresponding to the searched approximate marking image, gets the marking information (for example, document ID, print condition), and notifies the marking information to the image processing module 74 (S206). The image processing module 74 receives the marking information from the marking image analyzing module 68, reads the document image from the image data storing module 66 and the marking image from the marking image registration module 78 according to the marking information (S207), composes the document image and the marking image (S208), and prints the document with restored a marking image (S209). If the approximate marking image search module 82 is unable to identify a marking image corresponding to the searched approximate marking image (S205), an error message notification is sent to the user (S211).

Figure 7:
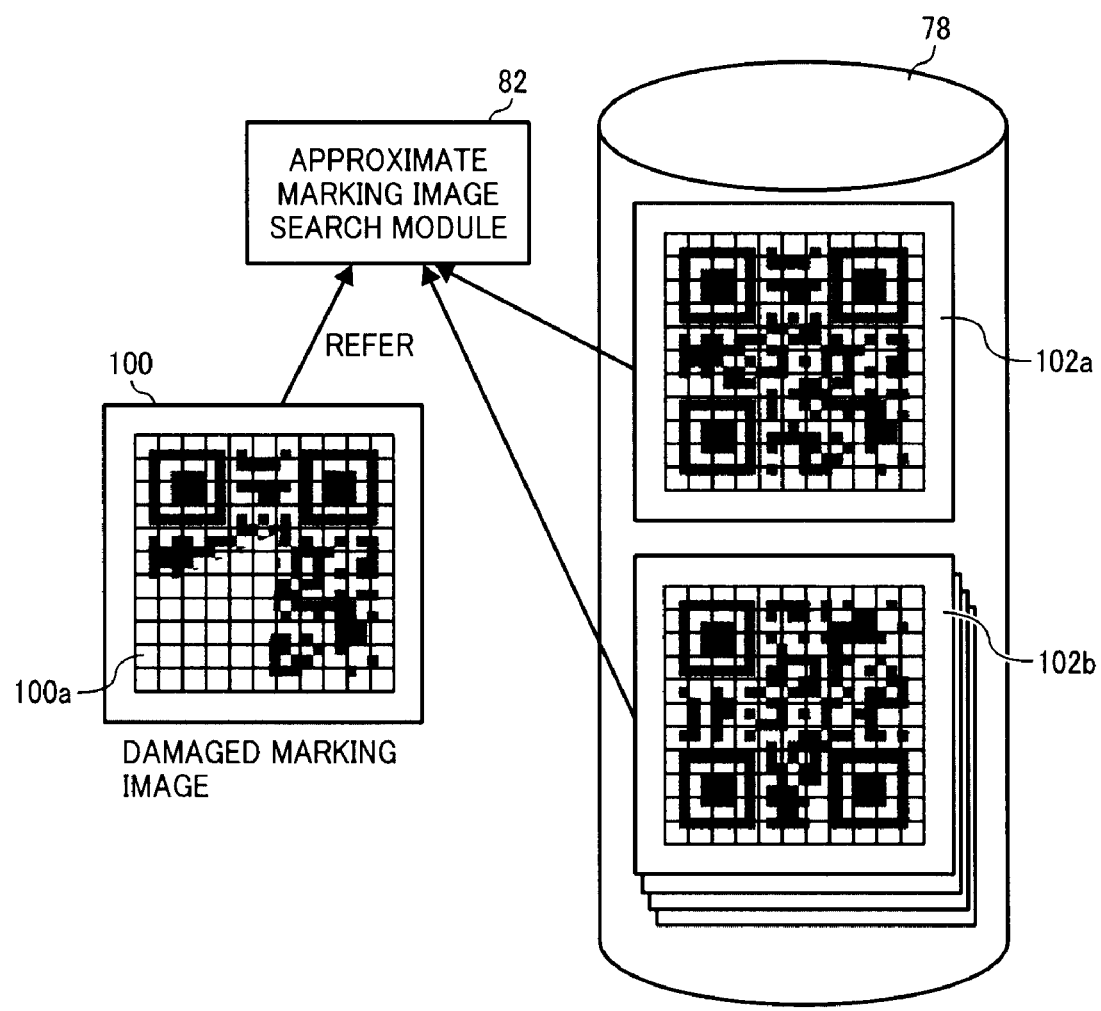
FIG. 7 is a diagram that illustrates an exemplary data flow that relates to searching for an approximate marking image in an image processing apparatus according to an exemplary aspect of the present invention.
Figure 8:
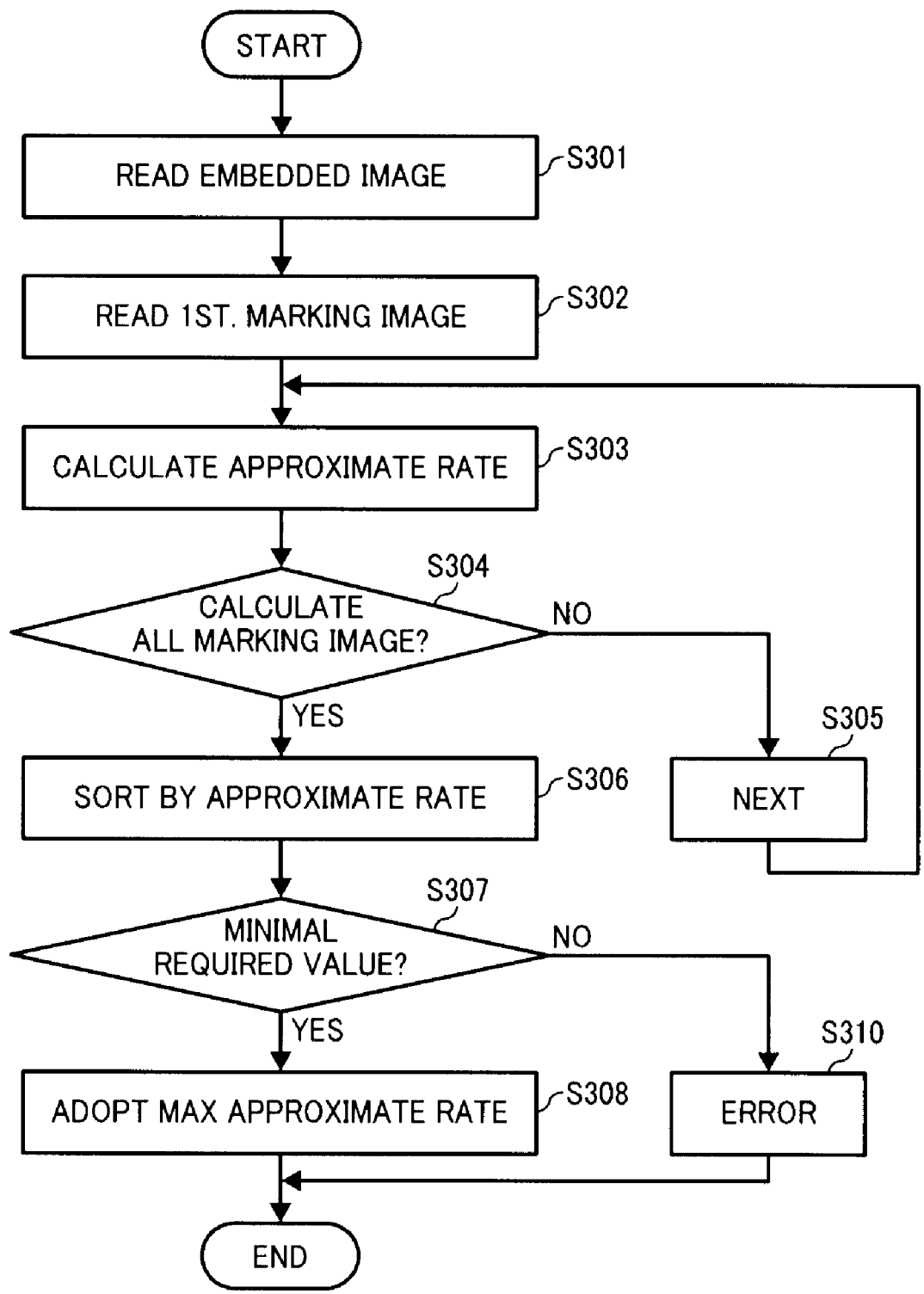
FIG. 8 is a flow chart that illustrates an exemplary search for an approximate marking image in an image processing apparatus according to an exemplary aspect of the present invention.

FIG. 7 is a diagram that illustrates an exemplary data flow of searching for an approximate marking image of an image processing apparatus according to an exemplary aspect of the present invention. FIG. 8 is a flow chart that illustrates an exemplary search for an approximate marking image of an image processing apparatus according to an exemplary aspect of the present invention.

Referring to FIG. 7 and FIG. 8, the approximate marking image search module 82 reads an embedded image (damaged marking image 100*a*) from the document image (S301), reads a first marking image 102*a* from the marking image registration module 78 (S302), and then calculates an approximate matching rate by comparing the damaged marking image 100*a* and the first marking image 102*a* (S303). The approximate matching rate may be calculated, for example, by the difference of pixels of each image data, least squares method, or any other method to calculate error rate that will be readily apparent to one of ordinary skill in the art. The approximate marking image search module 82 then calculates an approximate matching rate for all the marking images of the marking image registration module 78 one by one (102*a*, 102*b*, . . . ). For example, it can first be determined whether the matching rate for all marking images has been calculated (S304), and, if not, the matching rate for a next marking image in the marking registration module 78 can be calculated (S305). Once the matching rates of all of the marking images has been calculated, the approximate marking image search module 82 sorts the marking image by the approximate matching rate (S306) and checks whether the approximate matching rate meets a minimal required value (S307). If the approximate matching rate meets a minimal required value, the approximate marking image search module 82 adopts the marking image that has the maximum matching approximate matching rate (S308). Otherwise, the approximate marking image search module 82 sends an error message (S310).

Figure 10:
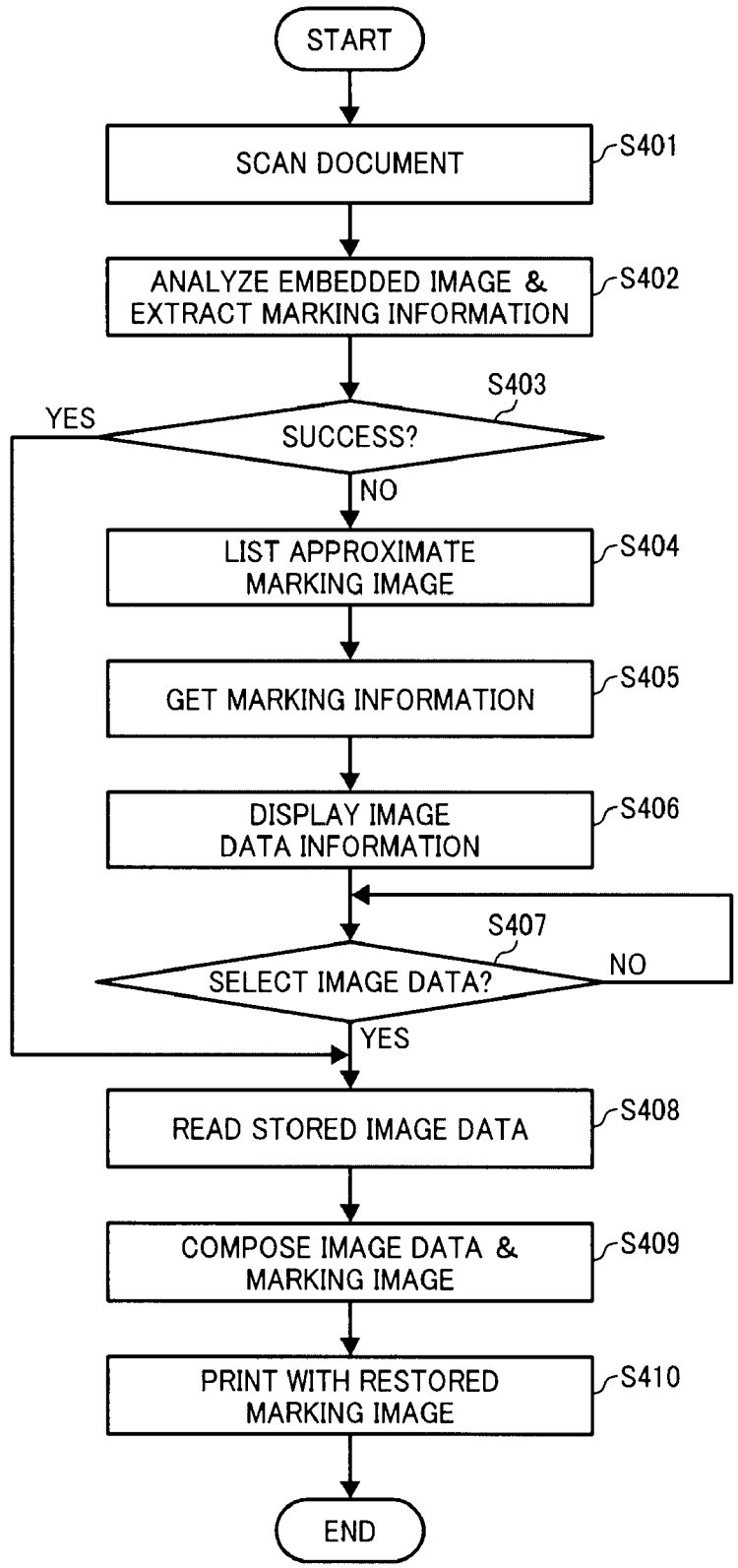
FIG. 10 is a flow chart that illustrates a second exemplary image processing apparatus according to an exemplary aspect of the present invention.

FIG. 10 is a flow chart that illustrates a second exemplary image processing apparatus according to an exemplary aspect of the present invention. As can be see in FIG. 10, a document image data is scanned (S401). The marking information extraction module 80 (such as that depicted in FIG. 5) then decodes an embedded image that has a predetermined position on the scanned document image data, and then extracts marking information (S402). Unlike the example illustrated in FIG. 6, the present example relies on user selection rather than automation to select an approximate marking image in the event that a damaged marking image is scanned. In particular, should the marking information extraction module 80 fail to decode a marking image of the document due to damage to the marking image (S403), the approximate marking image search module 82 retrieves approximate marking images from the marking image registration module 78, lists the approximate marking images, sorted by an approximate matching rate (S404), gets marking information from the marking image registration module 78 (S405), and displays the marking information (including marking image, document ID, or other information of the marking image) to the operation panel 42, with the approximate marking images sorted by the approximate matching rate (S406). The user can then select the image data of the marking image from the operation panel 42 (S407).

The image processing module 74 then receives the marking information selected by the user, reads the document image from the image data storing module 66 and the marking image from the marking image registration module 78 according to the marking information (S408), composes the document image and the marking image (S409), and prints the document with restored a marking image (S410).

Figure 11:
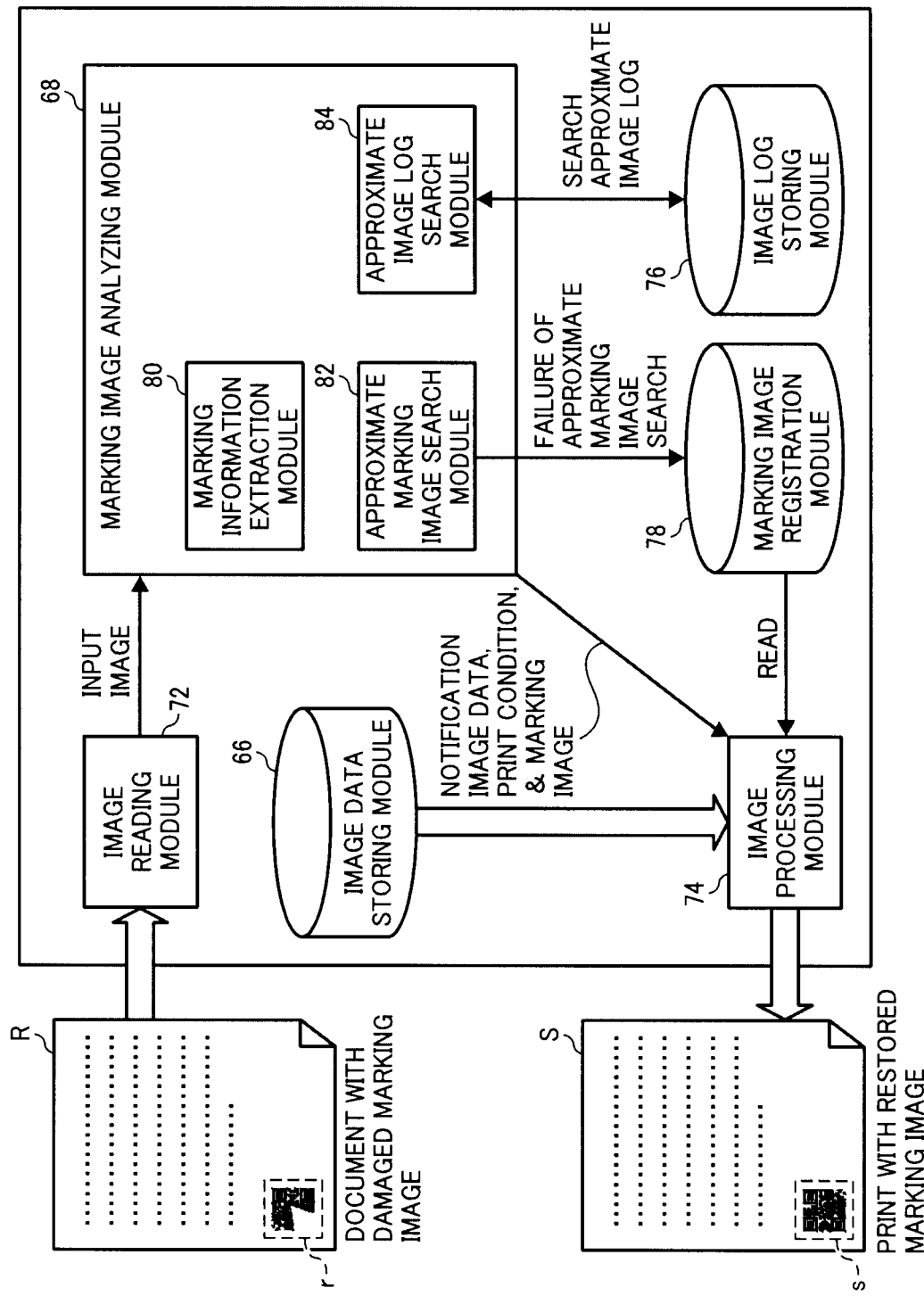
FIG. 11 is a diagram that illustrates a data flow of an exemplary image processing apparatus according to an exemplary aspect of the present invention.
Figure 12:
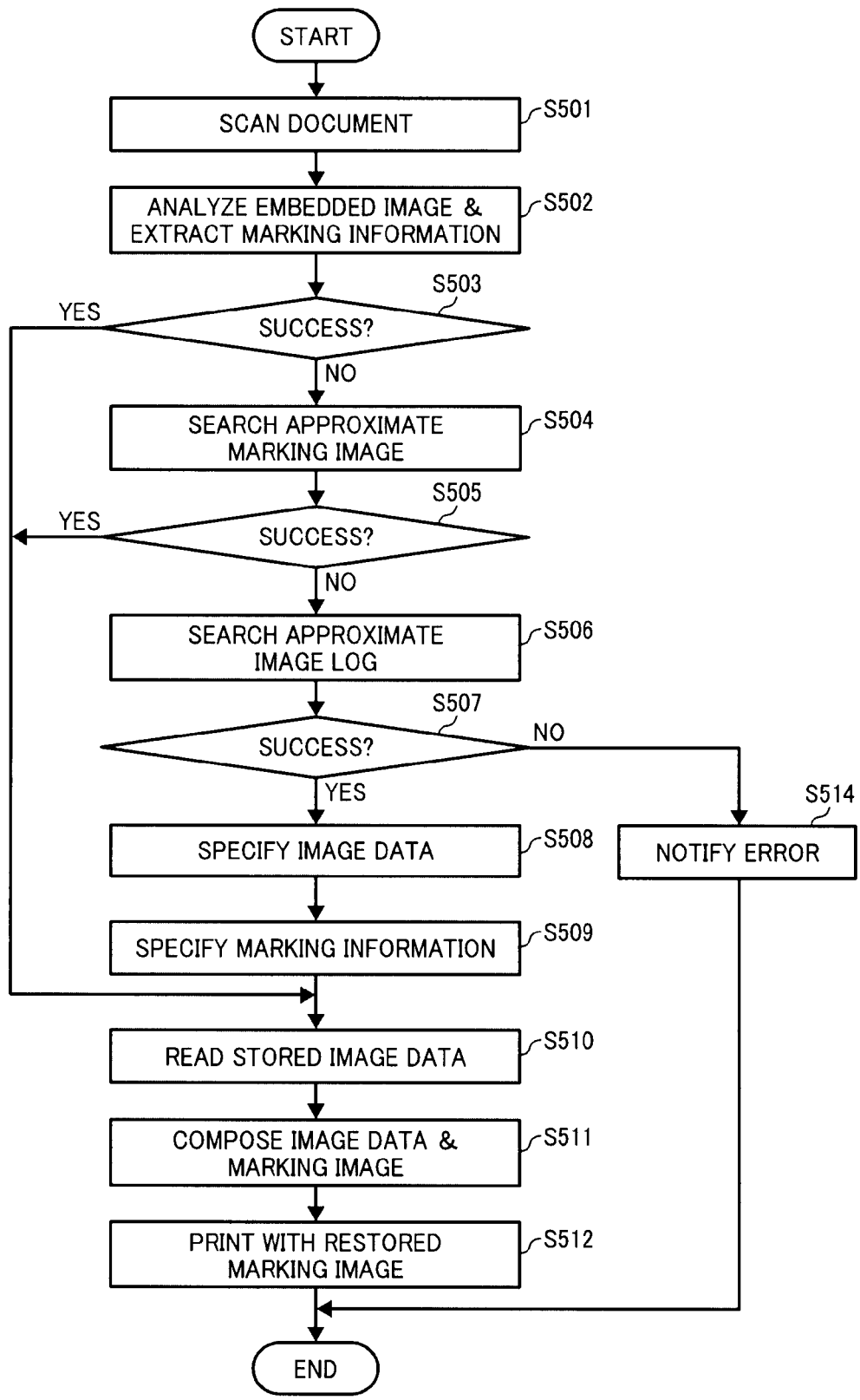
FIG. 12 is a flow chart that illustrates a third exemplary image processing apparatus according to an exemplary aspect of the present invention.

FIG. 11 is a diagram that illustrates a data flow of a third exemplary image processing apparatus according to an exemplary aspect of the present invention. FIG. 12 is a flow chart that illustrates a printing process of the third exemplary image processing apparatus according to an exemplary aspect of the present invention. The example depicted in FIG. 11 differs from the example illustrated in FIG.5 in that the marking image analyzing module 68 depicted in FIG. 11 additionally includes an approximate image log search module 84, and the MFP 10 additionally includes an image log storing module 76.

Referring to FIG. 11 and FIG. 12, a document image data is initially scanned (S501). The marking information extraction module 80 then decodes an embedded image that has a predetermined position on the scanned document image data (S501), and then extracts marking information (S502).

Should the marking information extraction module 80 fail to decode a marking image of the document due to damage to the marking image (S503), the approximate marking image search module 82 searches for an approximate marking image from the marking image registration module 78 (S504). If the approximate marking image search module 82 determines that a search has been successful, it selects the marking image corresponding to the searched approximate marking image (S505), retrieves the marking information (for example, document ID, print condition), and notifies the marking information to the image processing module 74.

However, if the approximate marking image search module 82 determines that a search has not been successful the approximate image log search module 84 searches an approximate image log from the image log storing module 76, which stores image log about a job carried out in the past (S506). The image log can include OCR data of the document and the information illustrated in FIG. 9, for example. If the search of the image log succeeds (S507), the approximate image log search module 84 specifies the image data corresponding to the approximate image log (S508), and retrieves the marking image and the marking information from the image data (S509). If, however, the search of the image log is not successful, an error message is delivered (S514).

When a successful marking information extraction is performed (S502), a successful approximate marking image search is performed (S505), or a successful approximate image log search is performed, the image processing module 74 receives the marking information selected by the user, reads the document image from the image data storing module 66 and the marking image from the marking image registration module 78 according to the marking information (S510), composes the document image and the marking image (S511), and prints the document with restored a marking image (S512).

Figure 13:
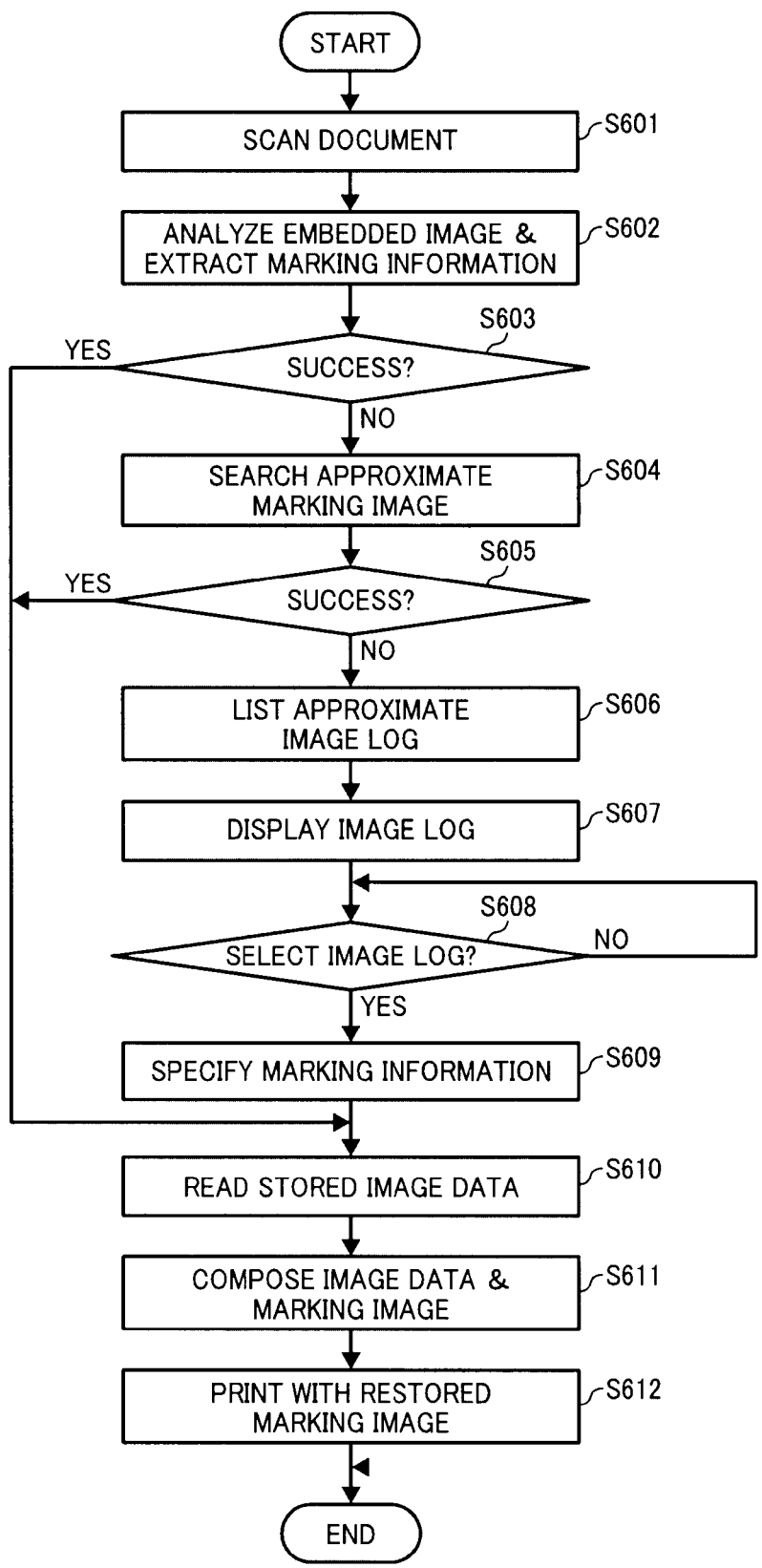
FIG. 13 is a flow chart that illustrates a fourth exemplary image processing apparatus according to an exemplary aspect of the present invention.

FIG. 13 is a flow chart that illustrates a fourth exemplary image processing apparatus according to an exemplary aspect of the present invention. Referring to FIG. 13, steps S601 to S605 proceed as described above with respect to steps S501 to S505 depicted in FIG. 12. The example depicted in FIG. 13 differs from that depicted in FIG. 12 in that the example depicted in FIG. 13 allows for manual selection following an image log search. In particular, the approximate image log search module 84 lists the approximate image log sorting by the approximate matching rate (S606) and then displays the image log to the operation panel 42 sorting by the approximate matching rate (S406). The user can then select the image log from the operation panel 42 (S407), and specifies the marking information (S609). Then, steps S610 to S612 proceed as described above with respect to steps S510 to S512 depicted in FIG. 12.

Obviously, numerous modifications and variations of the present invention are possible in light of the above teachings. It is therefore to be understood that within the scope of the appended claims, the invention may be practiced otherwise than as specifically described herein.

The invention claimed is:

1. An image processing method, comprising:
    reading a document image;
    storing the document image in a storage module;
    registering a plurality of marking images in a registration module by encoding different marking information into each respective one of the plurality of marking images;
    analyzing an embedded image in the document image by extracting marking information from the embedded image and comparing the embedded image to the plurality of marking images in the registration module;
    composing an output image based on the document image stored in the storage module and a result of the analyzing the embedded image; and
    outputting the output image,
    wherein the analyzing the embedded image in the document image includes searching for an approximate marking image by comparing the embedded image to the plurality of marking images stored in the registration module, and
    wherein the searching for the approximate marking image includes listing a plurality of approximate marking images that are sorted by an approximate matching rate, retrieving marking information relating to the plurality of approximate marking images from the marking image registration module, and displaying the marking information relating to the plurality of approximate marking images on an operation panel with the plurality of approximate marking images sorted by the approximate matching rate.

2. The image processing method as claimed in claim 1, wherein the searching for an approximate marking image includes evaluating a matching rate generated by the comparing the embedded image to the plurality of marking images stored in the registration module.

3. The image processing method as claimed in claim 1, wherein the analyzing the embedded image in the document image includes searching for an approximate marking image by comparing the embedded image to the plurality of marking images stored in an image log storing module that includes an image log of a previously performed image processing.

4. The image processing method as claimed in claim 3, wherein the searching for the approximate marking image includes listing an approximate image log with the plurality of marking images sorted by an approximate matching rate, and displaying the approximate image log to an operation panel such that the plurality of marking images are sorted by the approximate matching rate.

5. The image processing method as claimed in claim 1, wherein comparing the embedded image to the plurality of marking images in the registration module occurs in response to a failure to decode a marking image embedded in the document image due to damage to the marking image embedded in the document image.

6. A non-transitory computer readable storage medium including computer executable instructions, wherein the instructions, when executed by a processor, cause the processor to perform a method comprising:
    registering a plurality of marking images in a registration module by encoding different marking information into each respective one of the plurality of marking images;
    analyzing an embedded image in the document image by extracting marking information from the embedded image and comparing the embedded image to the plurality of marking images in the registration module;
    composing an output image based on the document image stored in the storage module and a result of the analyzing the embedded image; and
    outputting the output image,
    wherein the analyzing the embedded image in the document image includes searching for an approximate marking image by comparing the embedded image to the plurality of marking images stored in the registration module, and
    wherein the searching for the approximate marking image includes listing a plurality of approximate marking images that are sorted by an approximate matching rate, retrieving marking information relating to the plurality of approximate marking images from the marking image registration module, and sending the marking information relating to the plurality of approximate marking images to a display device on an operation panel with the plurality of approximate marking images sorted by the approximate matching rate.

7. The non-transitory computer readable storage medium as claimed in claim 6, wherein the searching for an approximate marking image includes evaluating a matching rate generated by the comparing the embedded image to the plurality of marking images stored in the registration module.

8. The non-transitory computer readable storage medium as claimed in claim 6, wherein the analyzing the embedded image in the document image includes searching for an approximate marking image by comparing the embedded image to the plurality of marking images stored in an image log storing module that includes an image log of a previously performed image processing.

9. The non-transitory computer readable storage medium as claimed in claim 8, wherein the searching for the approximate marking image includes listing an approximate image log with the plurality of marking images sorted by an approximate matching rate, and sending the approximate image log to a display device on an operation panel such that the plurality of marking images are sorted by the approximate matching rate.

10. The non-transitory computer readable storage medium as claimed in claim 6, wherein comparing the embedded image to the marking image in the registration module occurs in response to a failure to decode a marking image embedded in the document image due to damage to the marking image embedded in the document image.

* * * * *